W. S. Spratt.
Garden Cultivator.
No. 86,879. Patented Feb. 9, 1869.

Witnesses;
A. C. Johnston
W. Johnston

Inventor,
W. S. Spratt

WILLIAM S. SPRATT, OF ALLEGHENY CITY, PENNSYLVANIA, ASSIGNOR TO HIMSELF AND W. T. JAQUITH, OF THE SAME PLACE.

Letters Patent No. 86,879, dated February 9, 1869.

IMPROVEMENT IN GARDEN-CULTIVATORS.

The Schedule referred to in these Letters Patent and making part of the same.

*To all whom it may concern:*

Be it known that I, WILLIAM S. SPRATT, of the city and county of Allegheny, in the State of Pennsylvania, have invented a new and useful Improvement in Garden-Cultivators; and I do hereby declare that the following is a full, clear, and exact description thereof, reference being had to the accompanying drawings, and to the letters of reference marked thereon.

The nature of my invention consists in so constructing a garden-cultivator that its beam and handles shall consist of two parts, which are connected to an adjustable cultivator by means of two braces, the whole being so arranged that the angle or elevation of the handles and beam may be adjusted to suit the operator and the cultivator, and its parts may be adapted to the work to be done in the garden.

To enable others skilled in the art to make and use my invention, I will proceed to describe its construction and operation.

In the accompanying drawings, which form part of my specification—

Figure 2 is a top view or plan of the same.

Figure 1:
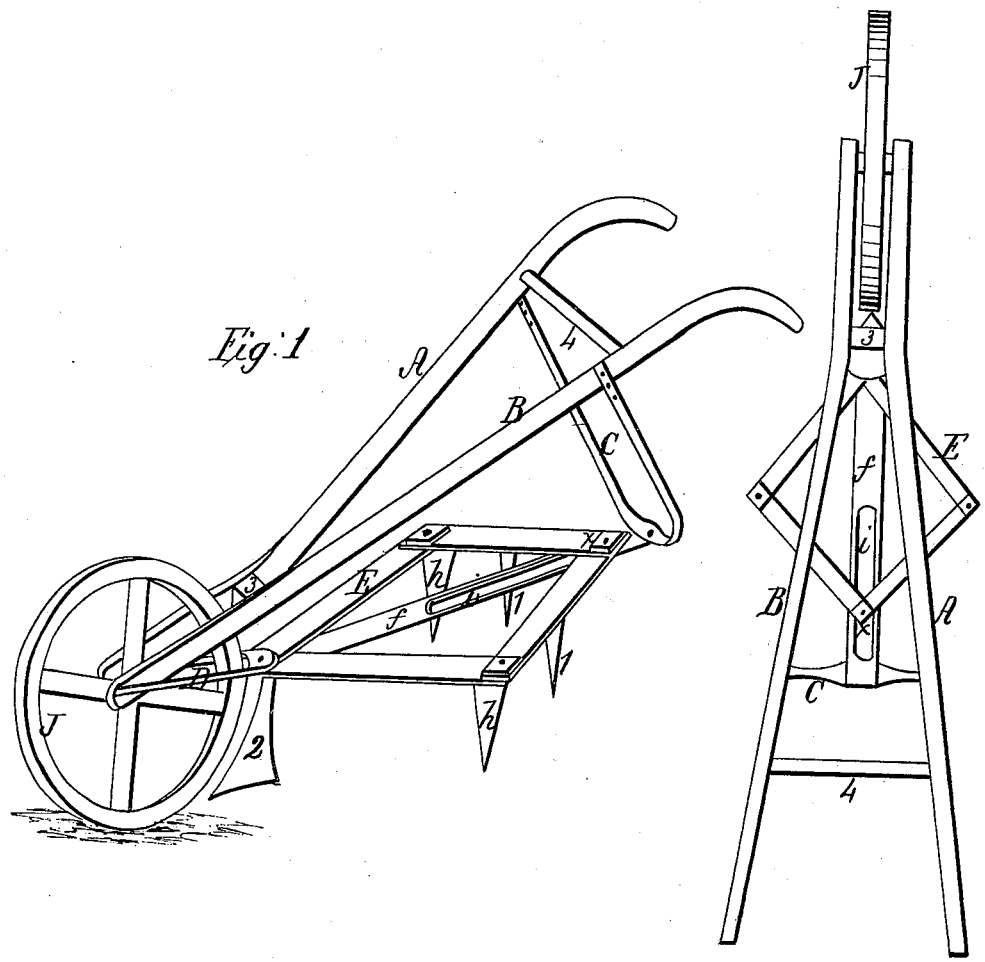
Figure 1 is a perspective view of my improvement in garden-cultivators.

In the drawings, A and B represent the two parts which form the handles and beam, which are held together by blocks 3 and rundle 4.

Between the parts A and B is pivoted a wheel, J.

To the front end of the parts A and B is attached a brace, D, and at a suitable point on the handles is attached an adjustable brace, C.

To the braces D and C is attached a toggle-frame, E, provided with a centre-piece, *f*, in which is a slot, *i*, in which is placed the bolt *x*, for the purpose of adjusting the toggle to the desired angle or form, that is to say, to spread or contract it.

To the under sides of the toggle-frame E is attached a cultivator, 2, cutters *h*, and harrow-teeth 1, all of which may be made in any desired form.

The cultivator 2 plows up the ground, the cutters *h* will cut up the furrow and cut off the "runners" or other out-shoots from plants, and the harrow-teeth will harrow up the soil.

The cutters *h* can be adjusted to suit the angle that may be given to the frame E.

The handles may be set at any desired angle, through the medium of the openings in the upper ends of the brace C.

The advantage of a garden-cultivator which can be adjusted to suit the operator, and be adapted to the difference in width between rows of plants in the garden, will be very apparent to all skilled in the art of cultivating gardens.

Having thus described the nature, construction, and operation of my improvement,

What I claim as of my invention, is—

1. The handles and beam, consisting of parts A and B, and provided with adjustable braces C and D, constructed and arranged substantially as herein described and for the purpose set forth.

2. In connection with the above, the toggle-frame E, provided with cutters, cultivators, and teeth, constructed, arranged, and operating substantially as herein described and for the purpose set forth.

W. S. SPRATT.

Witnesses:
A. C. JOHNSTON,
JAMES J. JOHNSTON.